(12) United States Patent
An et al.

(10) Patent No.: US 8,970,508 B2
(45) Date of Patent: Mar. 3, 2015

(54) TOUCH SCREEN PANEL

(75) Inventors: Suchang An, Seoul (KR); Heekwang Kang, Seoul (KR); Sangsoo Hwang, Seoul (KR); Gangseob Jung, Seoul (KR)

(73) Assignee: LG Display Co., Ltd., Seoul (KR)

( * ) Notice: Subject to any disclaimer, the term of this patent is extended or adjusted under 35 U.S.C. 154(b) by 817 days.

(21) Appl. No.: 12/774,217

(22) Filed: May 5, 2010

(65) Prior Publication Data
US 2011/0193793 A1 Aug. 11, 2011

(30) Foreign Application Priority Data
Feb. 11, 2010 (KR) .................. 10-2010-0012617

(51) Int. Cl.
*G06F 3/041* (2006.01)
*G06F 3/044* (2006.01)

(52) U.S. Cl.
CPC ...... *G06F 3/044* (2013.01); *G06F 2203/04111* (2013.01)
USPC .......................................................... 345/173

(58) Field of Classification Search
CPC ........................ G06F 2203/04111; G06F 3/044
USPC ................................................. 345/173–174
See application file for complete search history.

(56) References Cited

U.S. PATENT DOCUMENTS

| | | | |
|---|---|---|---|
| 5,804,476 A | 9/1998 | Jang | |
| 6,054,979 A | 4/2000 | Sellers | |
| 6,882,338 B2 | 4/2005 | Flowers | |
| 7,123,332 B2 | 10/2006 | Yamazaki et al. | |
| 2002/0067344 A1* | 6/2002 | Chiu | 345/173 |
| 2003/0122797 A1 | 7/2003 | Bang et al. | |
| 2005/0030048 A1 | 2/2005 | Bolender et al. | |
| 2006/0132461 A1 | 6/2006 | Furukawa et al. | |
| 2007/0268243 A1 | 11/2007 | Choo et al. | |
| 2008/0264699 A1 | 10/2008 | Chang et al. | |
| 2009/0085885 A1 | 4/2009 | Wu et al. | |
| 2009/0160682 A1 | 6/2009 | Bolender et al. | |
| 2009/0160824 A1 | 6/2009 | Chih-Yung et al. | |
| 2009/0315856 A1* | 12/2009 | Oikawa et al. | 345/174 |
| 2010/0026661 A1 | 2/2010 | Teramoto | |
| 2010/0045613 A1* | 2/2010 | Wu et al. | 345/173 |
| 2010/0110028 A1* | 5/2010 | Takahashi et al. | 345/173 |

(Continued)

FOREIGN PATENT DOCUMENTS

| | | |
|---|---|---|
| GB | 2476134 A | 6/2011 |
| GB | 2478804 A | 9/2011 |

(Continued)

*Primary Examiner* — Quan-Zhen Wang
*Assistant Examiner* — Tony Davis
(74) *Attorney, Agent, or Firm* — Birch, Stewart, Kolasch & Birch, LLP

(57) ABSTRACT

A touch screen panel includes a plurality of first connection patterns formed on a substrate; an insulation layer having a plurality of contact holes that exposes portions of the plurality of first connection patterns; and a plurality of first electrodes and a plurality of second electrodes formed on the insulating layer, wherein at least one of the plurality of first connection patterns connects at least one adjacent pair of the plurality of first electrodes through at least two of the plurality of contact holes that expose respective portions of the at least one of the plurality of first connection patterns, and at least one hollow is formed by portions of the at least one adjacent pair of the plurality of first electrodes being formed in the at least two of the plurality of contact holes.

17 Claims, 21 Drawing Sheets

(56) References Cited

U.S. PATENT DOCUMENTS

2010/0123674 A1* 5/2010 Wu et al. .................... 345/173
2010/0134436 A1* 6/2010 Jeong et al. ................ 345/174
2010/0164896 A1   7/2010 Nakayama et al.
2010/0182253 A1* 7/2010 Park et al. .................. 345/173

FOREIGN PATENT DOCUMENTS

| KR | 10-2008-0096977 A | 11/2008 |
| KR | 10-2008-0110477 A | 12/2008 |
| KR | 10-2009-0122586 A | 12/2009 |

\* cited by examiner

TOUCH SCREEN PANEL

This application claims the priority and the benefit of Korea Patent Application No. 10-2010-012617 filed on Feb. 11, 2010, the entire content of which is incorporated herein by reference for all purposes as if fully set forth herein.

BACKGROUND OF THE INVENTION

1. Field of the Invention

Embodiments of this invention relate to a capacitive type touch screen panel.

2. Discussion of the Related Art

Along with the development of the electronics industry, display devices, such as a liquid crystal display, an electroluminescent display, and a plasma display panel having a quick response speed, low power consumption, and an excellent color reproduction rate, have been in the spotlight. The display device is used for various electronic products such as a television, a monitor for a computer, a notebook computer, a mobile phone, a display unit of a refrigerator, a personal digital assistant, and an automated teller machine. In general, the display device interfaces with various input devices such as a keyboard, a mouse, and a digitizer. However, when a separate input device such as a keyboard, a mouse a digitizer is used, a user is required to know how to use the separate input device, and as the separate input device occupies space, the display device that is separate from the various input devices is inconvenient in view of customer satisfaction. Therefore, need for a convenient and simple input device that can reduce erroneous operation has gradually increased. According to such request a touch screen panel in which a user can input information by directly contacting with a screen by a finger or a pen is suggested.

Because the touch screen panel has a simple configuration while occurring little or no erroneous operations, can perform an input action without a separate input device, and has convenience in which the user can quickly and easily manipulate through contents displayed on a screen, the touch screen panel is applied to various display devices.

Touch screen panels are classified into a resistive type, a capacitive type, an electromagnetic type and so on according to a detection method of a touched portion. The resistive type touch screen panel determines a touched position by a voltage gradient according to resistance in a state that a DC voltage is applied to metal electrodes formed on an upper plate or a lower plate. The capacitive type touch screen panel senses a touched position according to a difference in capacitance created in an upper or lower plate when the user physically contacts with a conductive film formed on the upper or lower plate. The electromagnetic type touch screen panel detects a touched portion by reading an LC value induced as an electromagnetic pen touches a conductive film.

Hereinafter, a conventional capacitive type touch screen panel will be described with reference to FIGS. 1 and 2. FIG. 1 is a top plan view illustrating a conventional capacitive type touch screen panel, and FIG. 2 is a cross-sectional view illustrating the touch screen panel taken along line I-I' and line II-II' of FIG. 1.

Referring to FIGS. 1 and 2, the conventional capacitive type touch screen panel includes an electrode forming part 20, a routing wire forming part 40, a pad part 60, and a protective layer 50.

The electrode forming part 20 is formed on a substrate 10 and includes a plurality of first electrodes 21 arranged in parallel in a first direction (for example, an X-axis direction) and a plurality of second electrodes 22 arranged to intersect in a direction (for example, an Y-axis direction) perpendicular to the first electrodes 21. The first electrodes 21 and the second electrodes 22 intersect each other, but sustain an electrical insulation state by an insulation film 30. Further, neighboring first electrodes 21 arranged in the first direction are connected to each other by a bridge 41. That is, the bridge 41 connects the neighboring first electrodes 21 to each other through contact holes 30a and 30b formed in the insulation film 30 covering the first and second electrodes 21 and 22.

The routing wire forming part 40 is formed on the substrate 10 at positions outside the electrode forming part 20 and includes a plurality of first routing wires 42 connected to the plurality of first electrodes 21, respectively, and a plurality of second routing wires 43 connected to the plurality of second electrodes 22, respectively.

The pad part 60 includes a plurality of first pads connected to the plurality of first electrodes 21 through the plurality of first routing wires 42, respectively, and a plurality of second pads 62 connected to the plurality of second electrodes 22 through the plurality of second routing wires 43, respectively.

The protective layer 50 covers the electrode forming part 20 and the routing wire forming part 40 and prevents the first and second electrodes 21 and 22 and the first and second routing wires 42 and 43 from being exposed to the outside.

Hereinafter, a method of manufacturing a conventional capacitive type touch screen panel will be described with reference to FIGS. 3A to 3D.

Referring to FIG. 3A, a first conductive layer for forming first and second electrodes is deposited on the substrate 10 including an electrode forming part 20, a routing wire forming part 40, and the pad part 60 through a deposition process such as a sputtering method. As the first conductive layer, an indium tin oxide (ITO) layer is generally used. After a photoresist is coated on the substrate 10 in which the first conductive layer is formed, a first photoresist pattern for exposing the first conductive layer is formed in the electrode forming part 20 by performing a photolithography process using a first mask. After removing the first conductive layer exposed by the first photoresist pattern through wet etching, a plurality of first electrodes 21 and a plurality of second electrodes 22 intersecting the first electrodes 21 are formed on the substrate 10 by ashing the remaining first photoresist pattern.

Referring to FIG. 3B, after the first insulation film 30 is formed on the substrate 10 in which the plurality of first and second electrodes 21 and 22 are formed, the first insulation film 30 of the pad part 60 and the routing wire forming part 40 is removed and first and second contact holes 30a and 30b penetrating the first insulation film 30 of the electrode 20 are formed with a photolithography process and an etching process using a second mask. The first and second contact holes 30a and 30b expose a portion of the neighboring first electrodes 21. The first insulation film 30 includes silicon nitride, silicon oxide, or organic resin.

Referring to FIG. 3C, a second conductive layer is formed on an entire surface of the substrate 10 in which the first and second contact holes 30a and 30b are formed through a deposition process such as a sputtering method. The second conductive layer includes aluminum (Al) or molybdenum (Mo). After coating a photoresist on the substrate in which the second conductive layer is formed, first and second routing wires 42 and 43 are formed in a routing wire forming portion on the substrate 10 and a connection electrode 41 is formed on the first insulation film 30 of the electrode forming part 20 by performing a photolithography process and an etching process using a third mask. The connection electrode 41 connects the neighboring first electrodes 21 to each other through the first and second contact holes 30a and 30b formed in the first insulation film 30.

Referring to FIG. 3D, after a second insulation film 50 as a protective film is formed on an entire surface of the substrate 10 in which the connection electrode 41 and the first and second routing wires 42 and 43 are formed, a through hole 50a for penetrating the second insulation film 50 is formed to expose the first and second routing wires 42 and 43 of the pad 60 with a photolithography process and an etching process using a fourth mask.

However, the conventional capacitive type touch screen panel is manufactured with 4 mask processes, as described above, and each mask process accompanies a photolithography process requiring a series of continuous processes such as photoresist (PR), coating, alignment, exposure, development, and cleaning and thus it is necessary to reduce a number of a mask process. Further, because the first insulation film of an intersecting portion of the first electrode and the second electrode has a wide area and uses silicon nitride, silicon oxide, and organic resin, there is a problem that the first insulation film is viewed or apparent from the outside due to a color difference between the first insulation film and a periphery thereof. Further, the second insulation film formed as a protective film at the top of the touch screen panel is made of the same material as that of the first insulation film, and adhesive strength is weakened by gas used when depositing the first and second insulation films and thus surface hardness is weakened. Therefore, after a touch screen panel is manufactured, when a next process of forming a display device is performed, an additional problem of a scratch occurs. FIG. 4 is a drawing illustrating states before and after performing a scratch test of the touch screen panel manufactured in the related art, wherein the left picture illustrates a state before a scratch test and the right picture illustrates a state after a scratch test.

SUMMARY OF THE INVENTION

An object of this invention is to provide a touch screen panel that can improve productivity by reducing a process tact time through reducing mask process number of a capacitive type touch screen panel.

Another object of this invention is to provide a touch screen panel that can solve a visibility problem occurring due to a color difference between a first insulation layer for covering a first electrode and a second electrode used as a touch electrode and having a wide area and a periphery thereof and that can improve a transmittance and a color transition characteristic.

Another object of this invention is to provide a touch screen panel that can solve a problem of a scratch occurring due to low surface hardness of a second insulation layer formed as a protective layer at the top of the touch screen panel.

Additional features and advantages of this invention will be set forth in the description which follows, and in part will be apparent from the description, or may be learned by practice of this invention. The objectives and other advantages of this invention will be realized and attained by the structure particularly pointed out in the written description and claims hereof as well as the appended drawings.

To achieve these and other advantages and in accordance with the purpose of this invention, as embodied and broadly described, a touch screen panel includes a substrate; an electrode forming part comprising a plurality of first electrode serials and a plurality of second electrode serials formed on the substrate, the plurality of first electrode serials being arranged in parallel in a first direction, and the plurality of second electrode serials being arranged to intersect the first electrode serials; a routing wire forming part formed on the substrate at positions outside the electrode forming part and comprising a plurality of first routing wires connected to the plurality of first electrode serials, respectively, and a plurality of second routing wires connected to the plurality of second electrode serials, respectively; a plurality of first connection patterns formed on the same layer with the pluralities of first and second routing wires; and an insulation layer formed between the pluralities of first and second electrode serials and the substrate, and having a plurality of contact holes to expose portions of the plurality of first connection patterns, wherein each of the plurality of first electrode serials comprises a plurality of first electrode patterns and each of the plurality of second electrode serials comprises a plurality of second electrode patterns, and the plurality of first electrode patterns is formed as separated plurality of patterns, and the separated plurality of patterns are connected to each other through the plurality of contact holes and by the plurality of first connection patterns.

Another embodiment of the invention includes a method of manufacturing a touch screen panel, the method including a first process of forming a plurality of first connection patterns, a plurality of first routing wires, and a plurality of second routing wires simultaneously on a substrate; a second process of forming an insulation layer on an entire surface of the substrate and a plurality of contact holes in the insulating layer for exposing portions of at least one of the plurality of first connection patterns; and a third process of forming a plurality of first electrode serials and a plurality of second electrode serials on the insulation layer in which the plurality of contact holes are formed, the plurality of first electrode serials being arranged in parallel in a first direction, and the plurality of second electrode serials being arranged in parallel in a second direction intersecting the first direction.

Another embodiment of the invention includes a touch screen panel including a substrate; a plurality of first connection patterns formed on the substrate; an insulation layer formed on the substrate to cover the plurality of first connection patterns, and having a plurality of contact holes that exposes portions of the plurality of first connection patterns; and a plurality of first electrodes and a plurality of second electrodes formed on the insulating layer, the plurality of first electrodes being arranged in parallel in a first direction, and the plurality of second electrodes being arranged in a second direction that intersects the first direction, wherein at least one of the plurality of first connection patterns connects at least one adjacent pair of the plurality of first electrodes through at least two of the plurality of contact holes that expose respective portions of the at least one of the plurality of first connection patterns, and at least one hollow is formed by portions of the at least one adjacent pair of the plurality of first electrodes being formed in the at least two of the plurality of contact holes.

BRIEF DESCRIPTION OF THE DRAWINGS

The accompanying drawings, which are included to provide a further understanding of the invention and are incorporated in and constitute a part of this specification, illustrate implementations of the invention and together with the description serve to explain the principles of the invention. In the drawings.

DETAILED DESCRIPTION OF THE EMBODIMENTS

Figure 1:
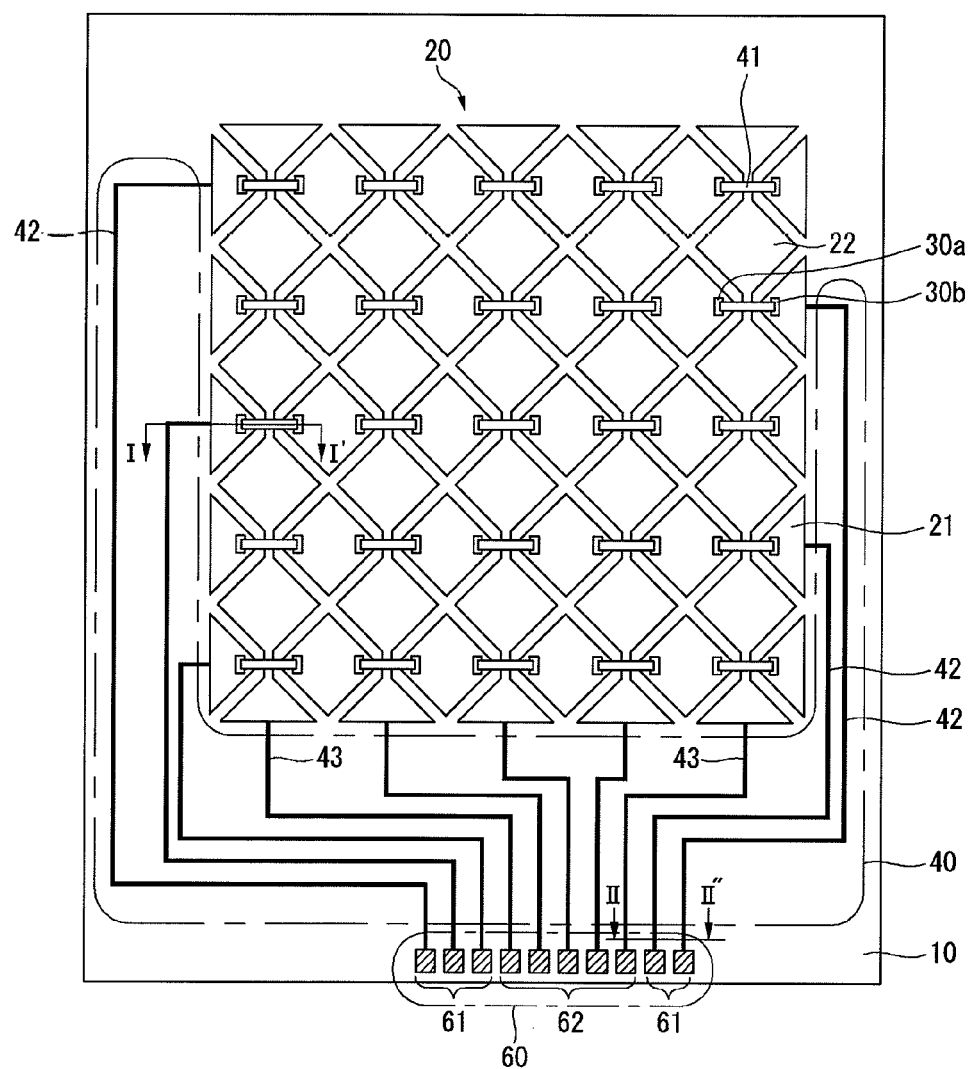
FIG. 1 is a top plan view illustrating a related art capacitive type touch screen panel.
Figure 2:
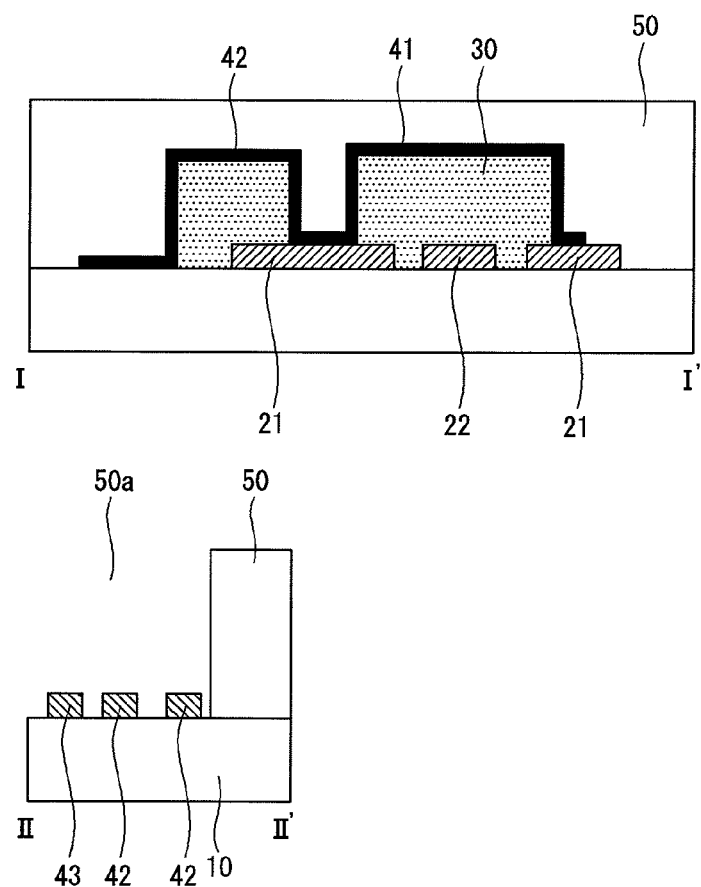
FIG. 2 is a cross-sectional view illustrating the touch screen panel taken along line I-I' and line II-II' of FIG. 1.
Figure 3A:
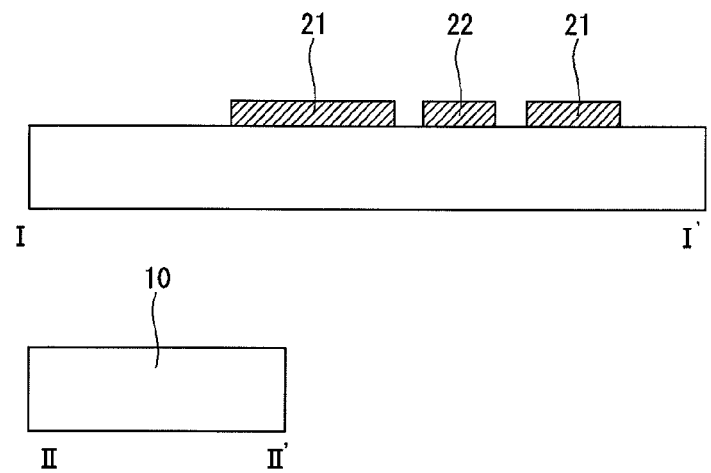
FIGS. 3A to 3D are cross-sectional views illustrating a process of manufacturing the touch screen panel shown in FIG. 1.
Figure 3B:
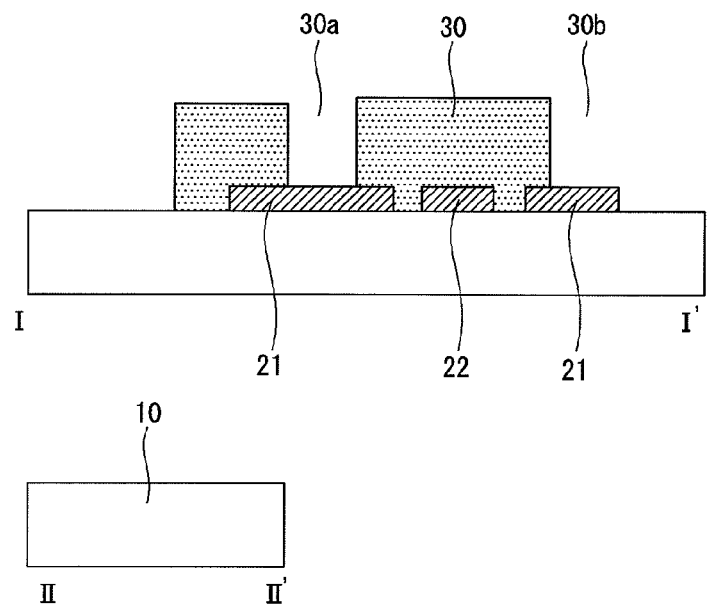
Figure 3C:
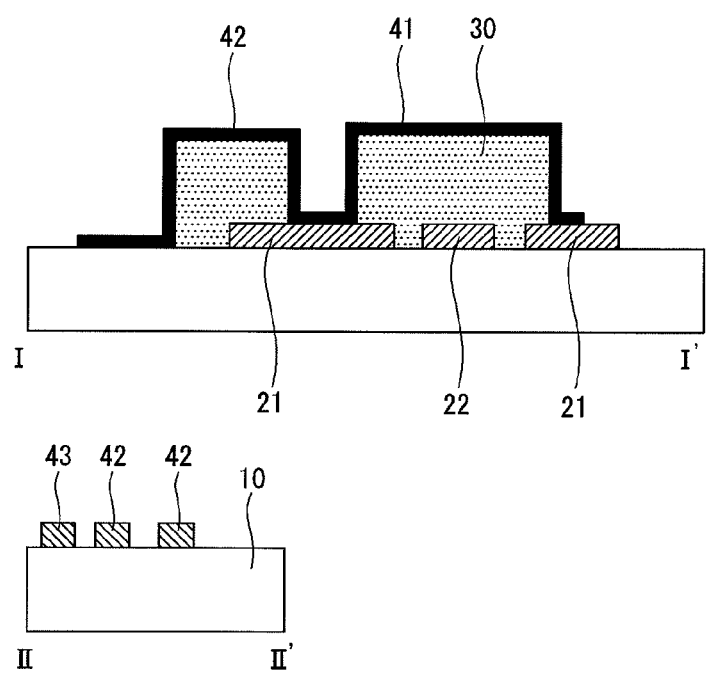
Figure 3D:
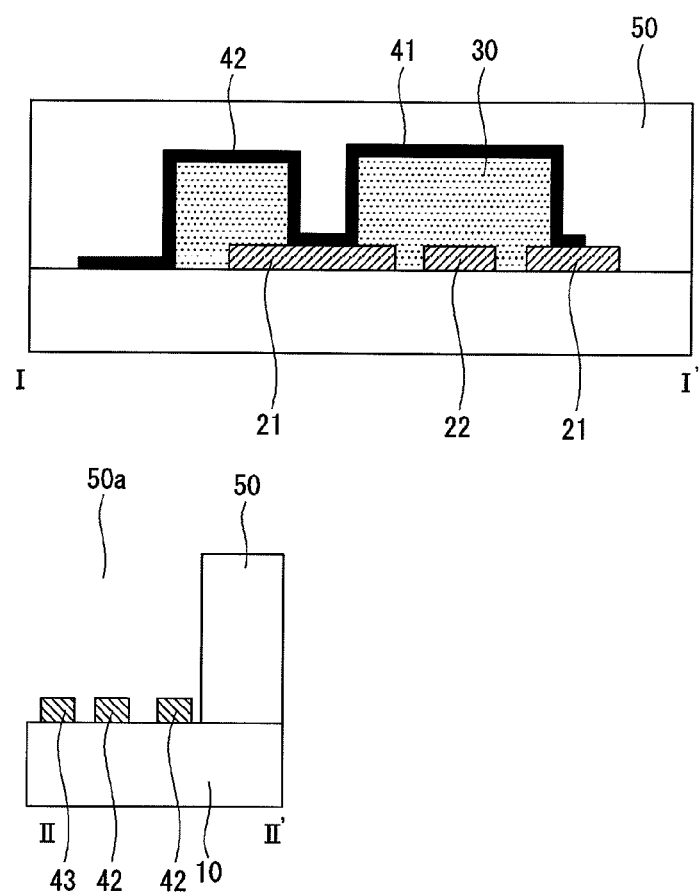
Figure 4:
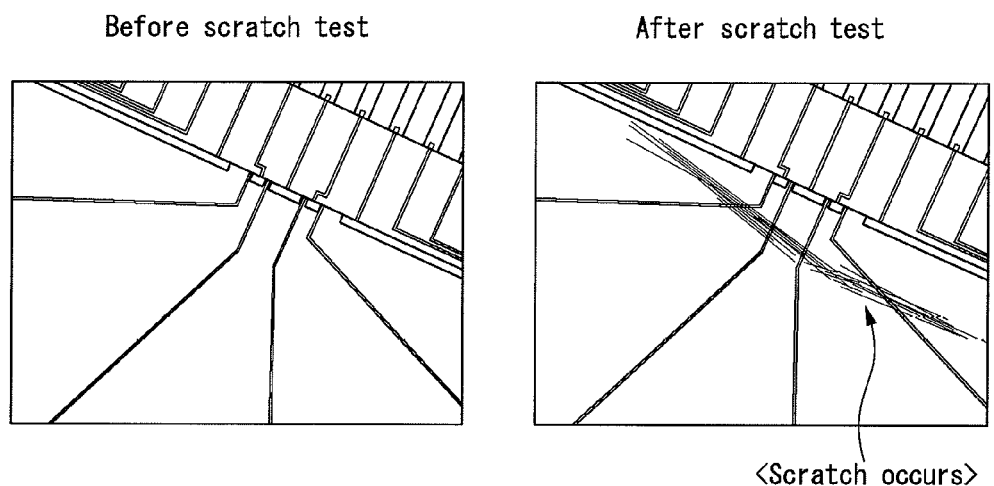
FIG. 4 is a drawing illustrating states before and after performing a scratch test of a related art touch screen panel.

Hereinafter, example embodiments of this invention will be described in detail with reference to FIGS. 5 to 16. Like reference numerals designate like elements throughout the specification.

Figure 5:
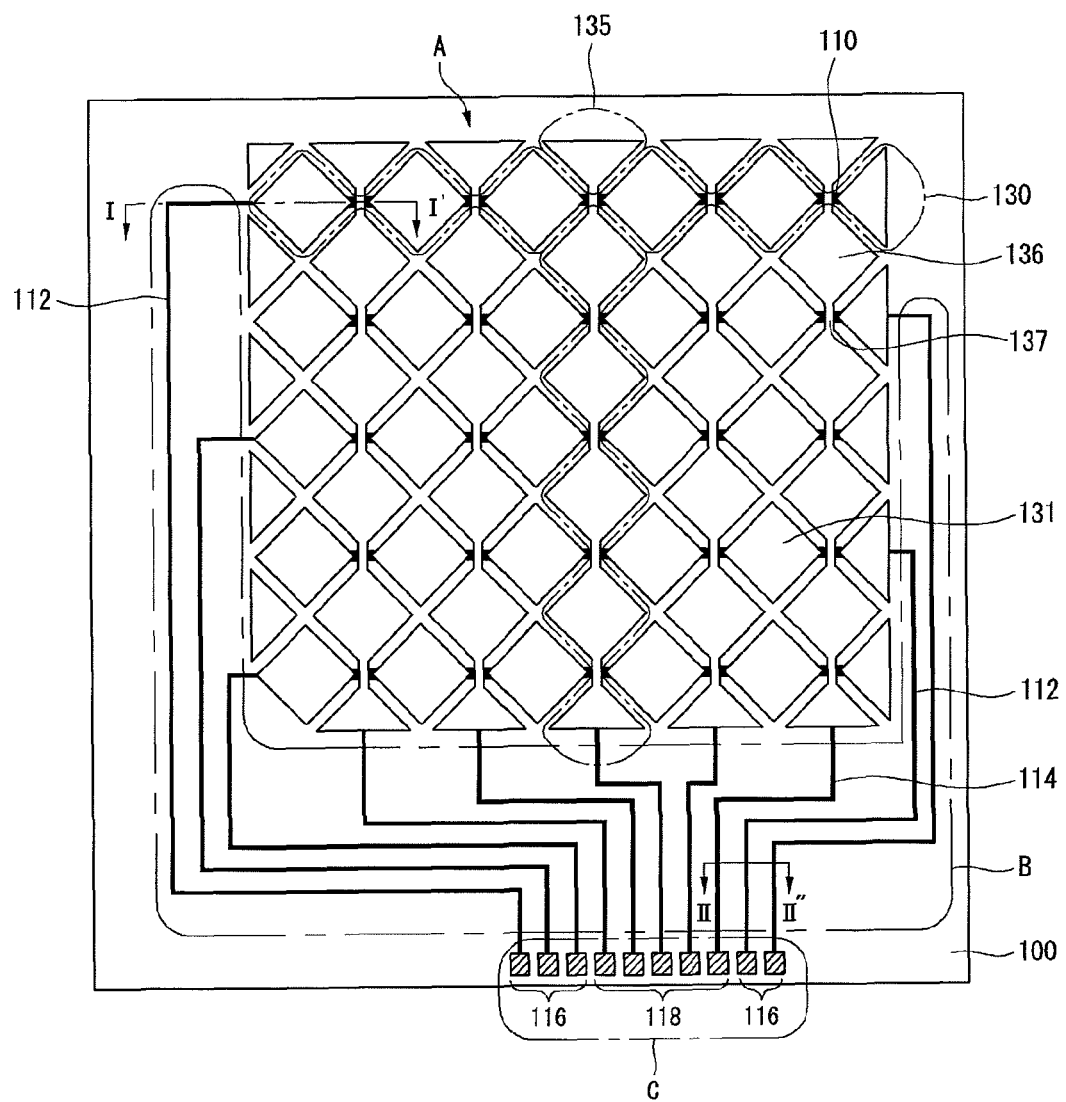
FIG. 5 is a top plan view illustrating a touch screen panel according to an embodiment of this invention.

An array substrate for a liquid crystal display according to an example embodiment of this invention will be described with reference to FIGS. 5 and 6. FIG. 5 is a top plan view illustrating a touch screen panel according to an example embodiment of this invention, and FIG. 6 is a cross-sectional view illustrating the touch screen panel taken along line I-I' and line II-II' of FIG. 5.

Figure 6:
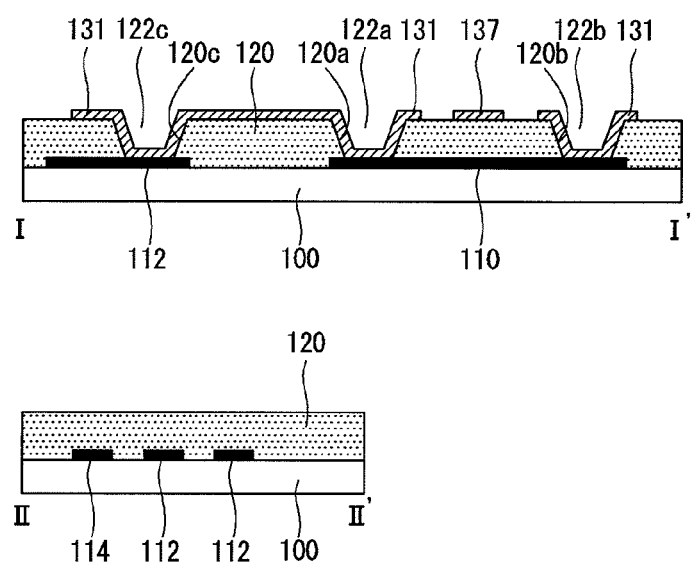
FIG. 6 is a cross-sectional view illustrating the touch screen panel taken along line I-I' and line II-II' of FIG. 5.

Referring to FIGS. 5 and 6, a capacitive type touch screen panel according to an example embodiment of this invention includes an electrode forming part A, a routing wire forming part B, and a pad part C.

The electrode forming part A includes a plurality of first electrode serials 130 optionally arranged in parallel in a first direction (for example, an X-axis direction) and a plurality of second electrode serial 135 optionally arranged in a second direction (for example, an Y-axis direction) to intersect the first electrode serials 130. Each of the first electrode serials 130 includes first electrode patterns 131 having a triangle, a quadrangle, a diamond shape, a polygon, and so on, and first connection patterns 110 for connecting neighboring first electrode patterns 131. Each of the second electrode serials 135 includes second electrode patterns 136 having a triangle, a quadrangle, a diamond shape, a polygon, and so on, similar to the first electrode patterns 131 and second connection patterns 137 for connecting neighboring second electrode patterns 136.

In an example embodiment of this invention, the first connection patterns 110 are formed separately from the first electrode patterns 131, and the second connection patterns 137 are integrally formed with the second electrode patterns 136. Alternatively, the first connection patterns 110 may be integrally formed with the first electrode patterns 131, and the second connection patterns 137 may be formed separately from the second electrode patterns 136.

The routing wire forming part B is formed on the substrate 100 at positions outside the electrode forming part A, and includes a plurality of first routing wires 112 connected to the plurality of first electrode serials 130, respectively and a plurality of second routing wires 114 connected to the plurality of second electrode serials 135, respectively.

The pad part C includes a plurality of first pads 116 connected to the plurality of first electrode serials 130 through the plurality of first routing wires 112, respectively, and a plurality of second pads 118 connected to the plurality of second electrode serials 135 through the plurality of second routing wires 114, respectively.

In the example embodiment of this invention, the first connection patterns 110, and the first and second routing wires 112 and 114 are formed on a substrate 100 through a same process and are made of a same material. In other embodiments, the first connection patterns 110, and the first and second routing wires 112 and 114 are formed of different materials. The first connection patterns 110 and the first and second routing wires 112 and 114 include one of Al, AlNd, Mo, MoTi, Cu, and Cr. Because these materials have a low resistivity, it is possible to lower contact resistance between the first and second electrode patterns 131 and 136 and the first connection pattern 110 or routing wires 112 and 114. Because ITO has high resistivity and should have a thick thickness, it is difficult to use ITO as a routing wire, and thus ITO is not used in the embodiment. However, the ITO may be used if desired.

Further, it is preferable, though not necessary, that the first connection patterns 110 connecting the neighboring first electrode patterns are formed to have a thickness of about 2,000 Å to about 3,000 Å and a width of about 3 μm to about 10 μm. If a thickness of the first connection patterns 110 is less than 2,000 Å, the resistance of the first connection patterns 110 is high, and if a thickness of the first connection patterns 110 is larger than 3,000 Å, a step difference of a pattern increases. Also, if a width of the first connection patterns 110 is less than 3 μm, the resistance of the first connection patterns 110 is high, and if a width of the first connection patterns 110 is larger than 10 μm, the pattern is visible.

Further, in the example embodiment, because the first connection patterns 110 and the first and second routing wires 112 and 114 are formed through one same mask process, one mask process can be omitted, compared with the related art that forms a connection pattern for connecting electrode patterns and routing wires in a two mask processes. Accordingly, it is possible to reduce a cost and a tact time (manufacturing time required per product unit for achieving a daily production target amount).

In the example embodiment of this invention, an insulation layer 120 is formed on the substrate 100 in which the first connection patterns 110 and the first and second routing wires 112 and 114 are formed, and in the insulation layer 120, first and second contact holes 120*a* and 120*b* for exposing portions of each of the first connection patterns 110, a third contact hole 120*c* for exposing one portion of the first routing wires 112 and a fourth contact hole 120*d* (see FIG. 8A) for exposing one portion of the second routing wires 114 are formed. The insulation layer 120 includes silicon nitride (SiNx). If a thickness of the insulation layer 120 is less than 5,000 Å, the insulation layer 120 may be destroyed or damaged by a voltage applied to the first electrode serial 130 and the second electrode serial 135. Therefore, in order to prevent or reduce a phenomenon in which a failure occurs due to destruction or damage of the insulation layer 120 while using the touch screen panel, it is preferable, though not required, to form the insulation layer so that a thickness of the insulation layer is about 5,000 Å or more.

Further, if a thickness of the insulation layer 120 is about 6,000 Å, a saturation state in which a transmittance no longer increases is observed and a color transition phenomenon becomes a minimum. That is, in view of a transmittance and chromaticity expression, when a thickness of the insulation layer 120 is 6,000 Å or more, a transmittance becomes a maximum and a color transition phenomenon becomes a minimum and thus it is most preferable that the insulation layer 120 has a thickness of 6,000 Å or more. However, if a thickness of the insulation layer 120 exceeds 7,000 Å, it is difficult to form a contact hole and much more process time is required due to a characteristic of a silicon nitride layer used as a material of the insulation layer 120. Accordingly, it is not preferable, though not required, that a thickness of the insulation layer 120 exceeds 7,000 Å. Therefore, when considering stability of the insulation layer 120, a good light transmittance, and chromaticity expression ability together, it is preferable, though not required, to form a thickness of the insulation layer 120 in a range of 5,000 Å to 7,000 Å.

Further, a plurality of first electrode serials 130 and a plurality of second electrode serials 135 are formed on the insulation layer 120 in which the first to fourth contact holes 120*a*, 120*b*, 120*c*, and 120*d* (see FIG. 8A) are formed. Each of the plurality of first electrode serials 130 includes a plurality of first electrode patterns 131 and is optionally arranged in a first direction (for example, an x-axis direction). Each of the plurality of second electrode serials 135 includes a plurality of second electrode patterns 136 and is optionally arranged in a second direction (for example, a y-axis direction) intersecting the first direction. Because the first electrode patterns 131 forming the first electrode serial 130 are separated from each other, the first electrode patterns 131 are connected to the portions of the first connection pattern 110 exposed through the first and second contact holes 120*a* and 120*b* formed in the insulation layer 120, and the first electrode patterns 131 positioned at the outermost side are connected to the first routing wires 112 exposed through the third contact hole 120*c*.

As shown in FIG. 6, portions of the plurality of first electrode patterns 131 are formed in the contact holes 120*a*, 120*b* and 120*c* so that the portions of the plurality of first electrode patterns 131 are partially filled in the contact holes 120*a*, 120*b* and 120*c*. For example, portions of the plurality of first electrode patterns 131 are formed on side walls of the contact holes 120*a*, 120*b* and 120*c*, and on exposed portions of the first connection patterns 110 and the first routing wires 112. Accordingly, hollows or cavities 122*a*, 122*b*, and 122*c* are respectively formed by the portions of the plurality of first electrode patterns 131 being partially filled in the contact holes 120*a*, 120*b* and 120*c*.

Figure 8A:
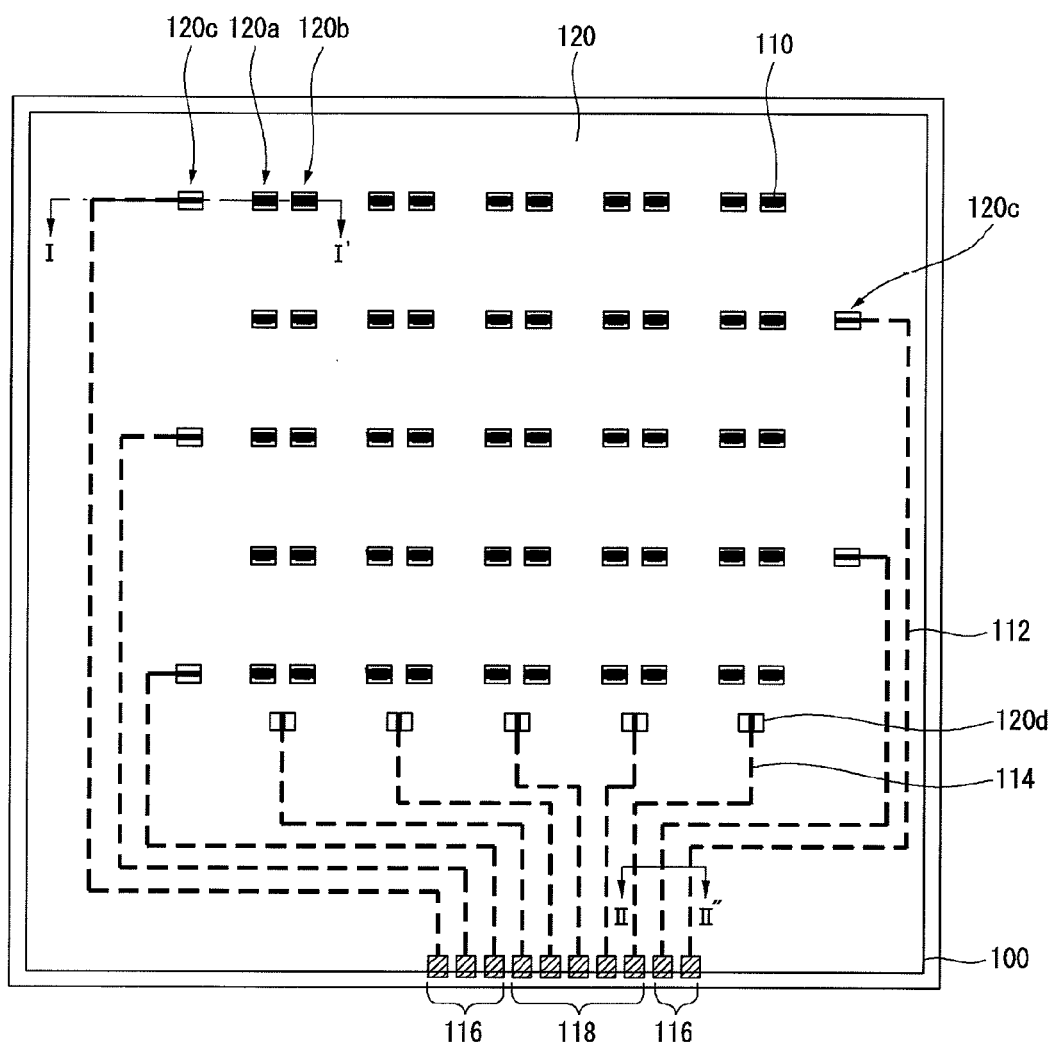
FIGS. 8A to 8D are a top plan view and cross-sectional views illustrating a second mask process of a process of manufacturing the touch screen panel shown in FIG. 5.

The second electrode patterns 136 forming the second electrode serial 135 are integrally formed with the second connection patterns 137 and are connected to the second routing wires 114 exposed through the fourth contact hole 120*d* (see FIG. 8A).

The first and second electrode patterns 131 and 136 and the second connection patterns 137 are made of the same material through the same process. The first and second electrode patterns 131 and 136 and the second connection patterns 137 are made of a transparent metal material such as ITO or IZO. In the example embodiment, because the first and second electrode serials 130 and 135 and the second connection patterns 137 using ITO are formed in a top layer of the touch screen panel and ITO has very high hardness, a scratch does not occur in a subsequent process of forming a display device on the other surface of the substrate 100 of the touch screen panel, and thus a touch screen panel of a good quality is obtained.

Hereinafter, a method of manufacturing a capacitive type touch screen panel according to the example embodiment of this invention will be described with reference to FIGS. 7A to 9B.

Figure 7A:
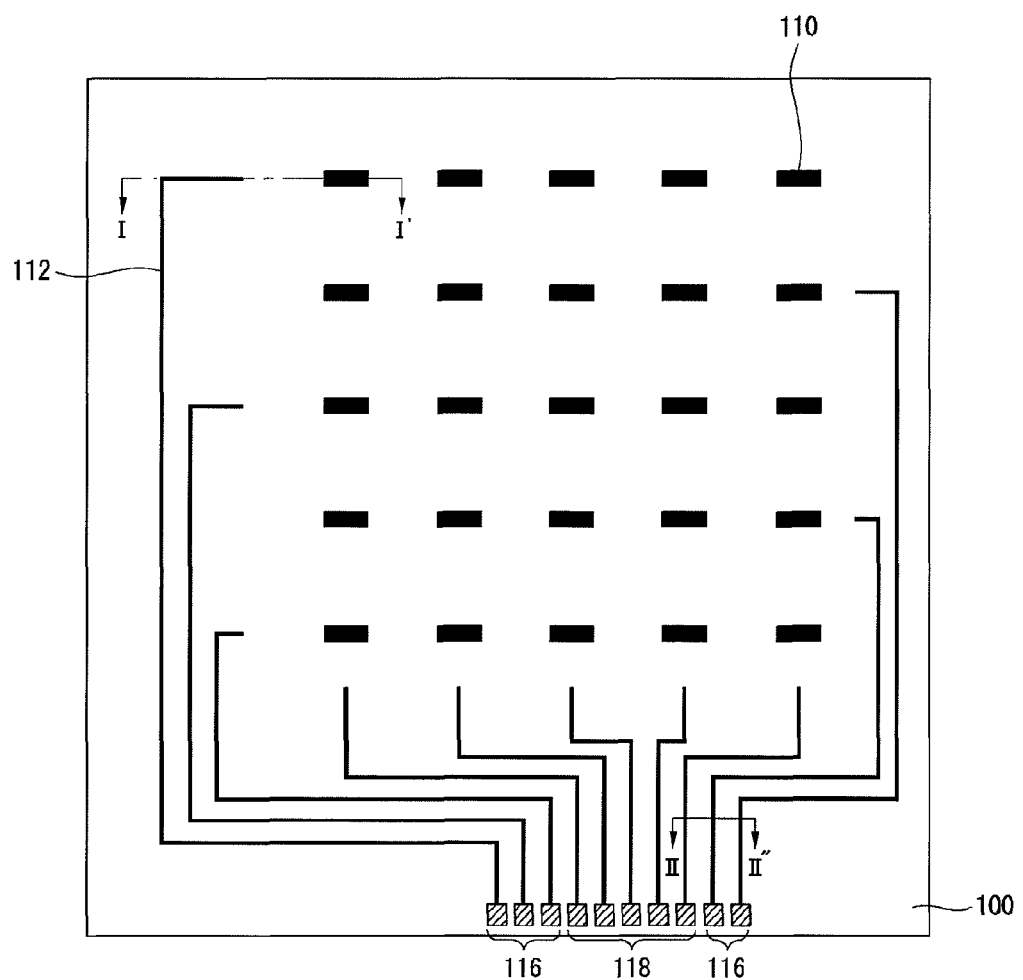
FIGS. 7A to 7B are a top plan view and a cross-sectional view illustrating a first mask process of a process of manufacturing the touch screen panel shown in FIG. 5.
Figure 7B:
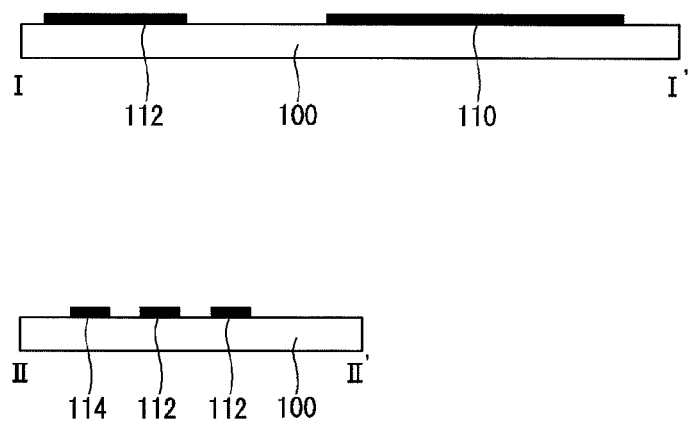

FIGS. 7A to 7B are a top plan view and a cross-sectional view illustrating a first mask process in the method of manufacturing the capacitive type touch screen panel according to the example embodiment of this invention.

Referring to FIGS. 5, 7A, and 7B, a first conductive pattern group including first connection patterns 110, first routing wires 112, and second routing wires 114 is formed on the substrate 100 including an electrode forming part A, the routing wire forming part B, and the pad part C using the first mask process.

In more detail, a first conductive layer is deposited on the substrate 100 through a deposition process such as a sputtering method. As the first conductive layer is patterned with a photolithography process and an etching process using a first mask, the first conductive pattern group including the first connection patterns 110, the first routing wires 112, and the second routing wires 114 is formed. Here, as a material forming the first conductive pattern group, Al, AlNd, Mo, MoTi, Cu, Cr, ITO and so on are used. The first connection pattern 110 formed in the electrode forming area A (see FIG. 5) is formed to have a thickness of about 2,000 Å to about 3,000 Å and a width of about 3 µm to about 10 µm.

In another embodiment, the first conductive pattern group including the first connection patterns 110, the first routing wires 112, and the second routing wires 114 may be formed by being printed on the substrate 100. Subsequent drying and/or heating process may be performed. In such a case, the photolithography process and the etching process using the first mask may be skipped. In other embodiments, other pattern forming processes may be used.

FIGS. 8A to 8D are a top plan view and cross-sectional views illustrating a second mask process in a method of manufacturing a capacitive type touch screen panel according to the example embodiment of this invention. The first and second routing wires 112 and 114 indicated by dotted lines in FIG. 8A because they are covered by the insulation layer 120, and the first and second routing wires 112 and 114 are portions that are not displayed in a top plan view, however for a better understanding, in this invention, the first and second routing wires 112 and 114 are indicated by dotted lines.

Figure 8B:
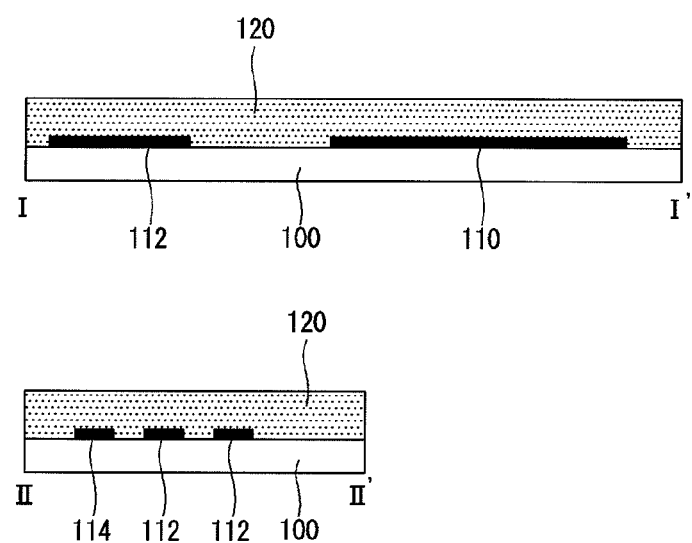

Referring to FIGS. 8A and 8B, the insulation layer 120 is formed through a deposition method such as sputtering on an entire surface of the substrate 100 in which the first conductive pattern group including the first connection patterns 110, the first routing wires 112, and the second routing wires 114 is formed. As a material of the insulation layer 120, an inorganic insulation material such as silicon nitride (SiNx) is used. A thickness of the insulation layer 120 is preferably set to a range of about 5,000 Å to about 10,000 Å, more preferably, though not required, to a range of about 5,000 Å to about 7,000 Å.

Figure 8C:
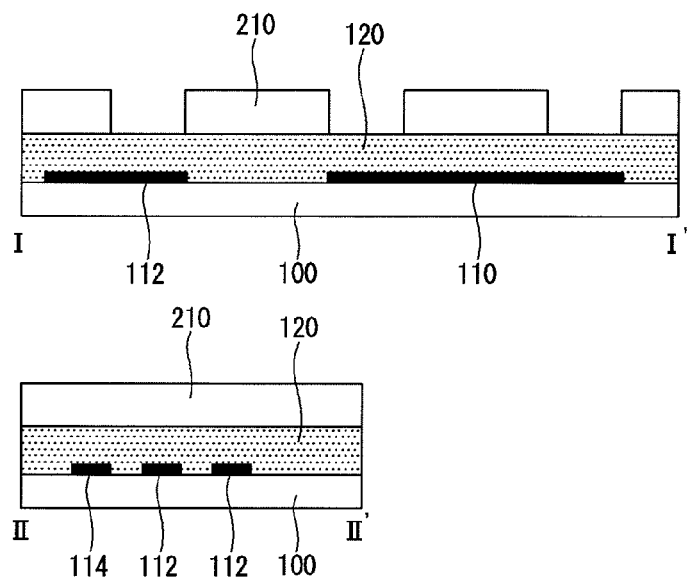
Figure 8D:
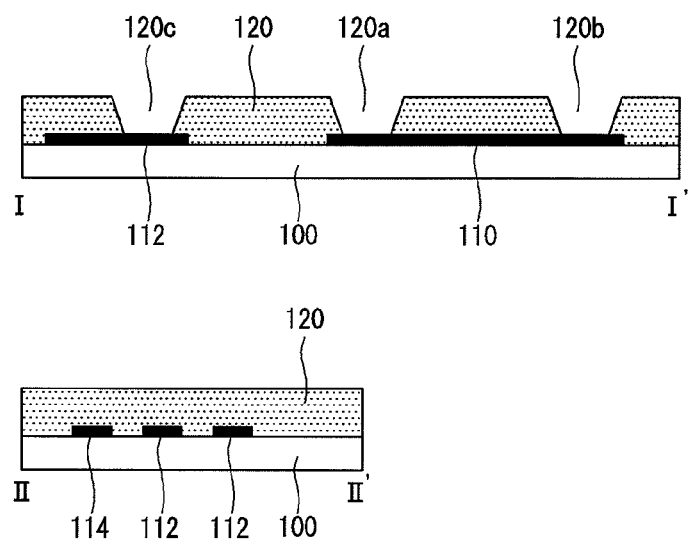

After the insulation layer 120 is formed, as shown in FIG. 8C, a photoresist pattern 210 is formed on a portion in which the insulation layer 120 should exist by a photolithography process using a second mask. First to fourth contact holes 120a, 120b, 120c, and 120d (see FIG. 8A) penetrating the insulation layer 120 are formed with a dry etching process using the photoresist pattern 210. Next, when the photoresist pattern 210 is removed, as shown in FIG. 8D, first to fourth contact holes 120a, 120b, 120c, and 120d for exposing the first conductive patterns 110, 112, and 114 are formed. Here, the first contact hole 120a exposes a portion of the first connection pattern 110, the second contact hole 120b exposes another portion of the first connection pattern 110, the third contact hole 120c exposes a portion of the first routing wire 112, and the fourth contact hole 120d (see FIG. 8A) exposes a portion of the second routing wire 114.

Figure 9A:
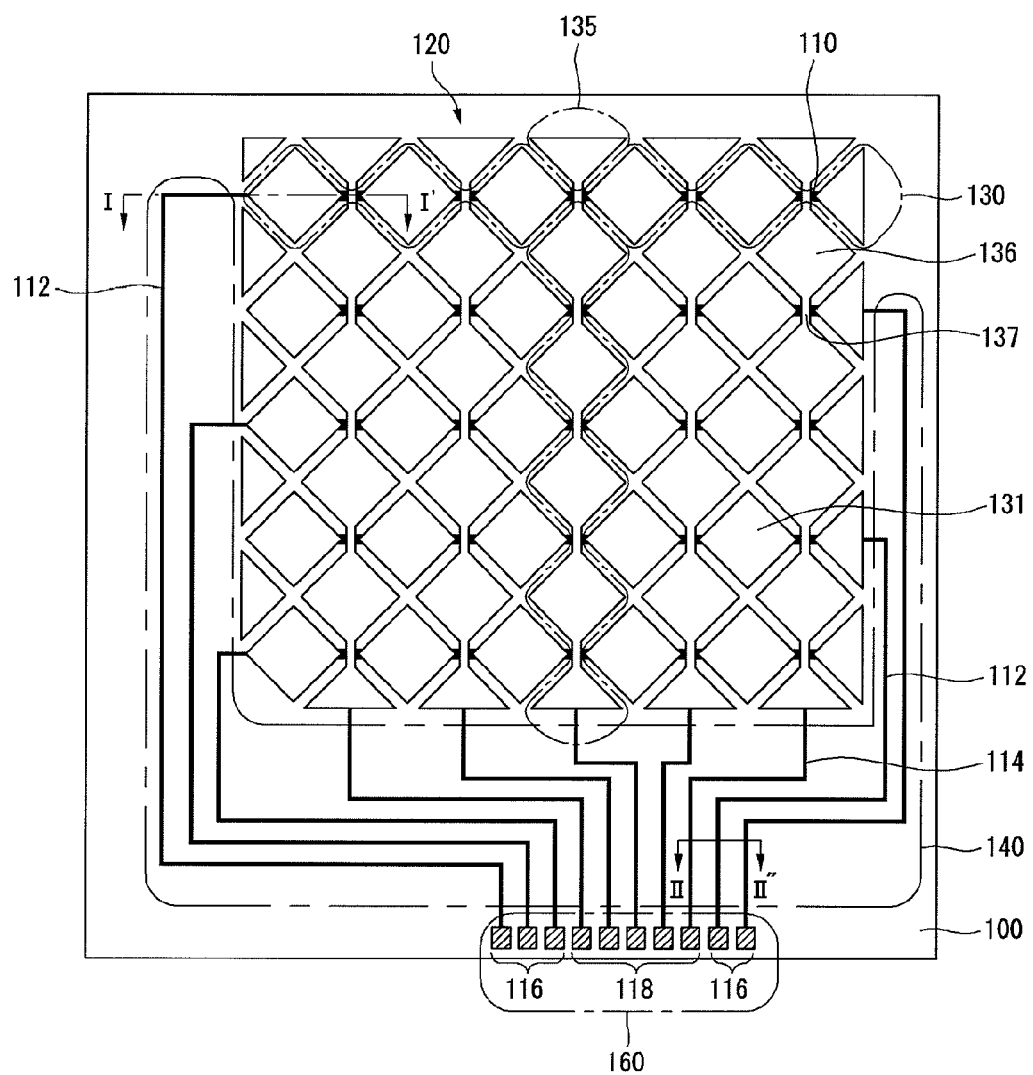
FIGS. 9A to 9B are a top plan view and a cross-sectional view illustrating a third mask process of a process of manufacturing the touch screen panel shown in FIG. 5.
Figure 9B:
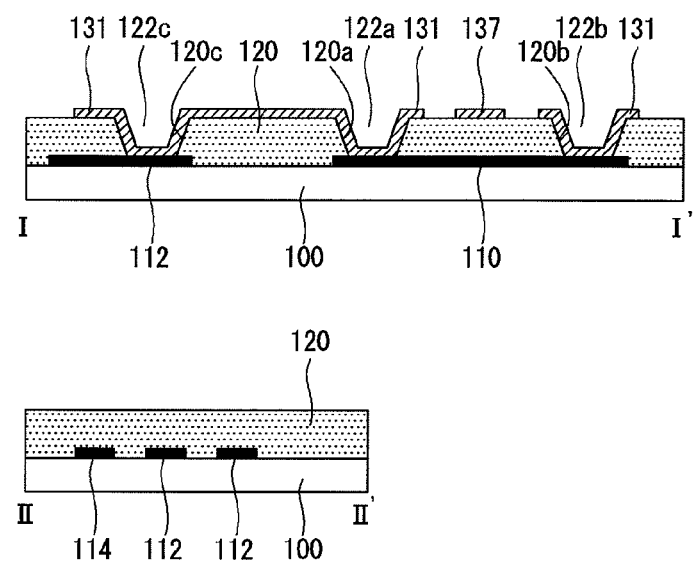

FIGS. 9A to 9B are a top plan view and a cross-sectional view illustrating a third mask process in the method of manufacturing the capacitive type touch screen panel according to the example embodiment of this invention. FIG. 9A is a top plan view illustrating the third mask process in the method of manufacturing the capacitive type touch screen panel according to the example embodiment of this invention, and for a better understanding, in FIG. 9A, the insulation layer 120 formed between the first conductive pattern group and the second conductive pattern group is not depicted.

Referring to FIGS. 9A and 9B, the second conductive pattern groups including a plurality of first electrode serials 130 and a plurality of second electrode serials 135 formed on the insulation layer 120 in which the first to fourth contact holes 120a, 120b, 120c, and 120d (see FIG. 8A) are formed using the third mask process. The plurality of first electrode serials 130 are optionally arranged in parallel in a first direction (for example, an x-direction). And the plurality of second electrode serials 135 are optionally arranged in parallel in a second direction (for example, a y-direction) intersecting the first direction.

In more detail, the second conductive layer is deposited through a deposition process such as sputtering on an entire surface of the insulation layer 120 in which the first to fourth contact holes 120a, 120b, 120c, and 120d (see FIG. 8A) are formed. Thereafter, the second conductive layer is patterned with a photolithography process and an etching process using a third mask to form the second conductive pattern group including a plurality of first electrode serials 130 arranged parallel in the first direction (for example, an x-direction) and a plurality of second electrode serials 135 arranged parallel in the second direction (for example, an y-direction) intersecting the first direction. Here, each of the first electrode serials 130 includes the plurality of first electrode patterns 131, and each of the second electrode serials 135 includes the plurality of second electrode patterns 136 and the second connection patterns 137 for connecting neighboring second electrode patterns 136. As a material of the second conductive layer, ITO is used, and if a thickness thereof is about 1,200 Å to about 1,600 Å, a maximum transmittance can be obtained.

Also, as shown in FIG. 9B, portions of the plurality of first electrode patterns 131 are deposited in the contact holes 120a, 120b and 120c so that the portions of the plurality of first electrode patterns 131 are partially filled in the contact holes 120a, 120b and 120c. For example, portions of the plurality of first electrode patterns 131 are deposited on side walls of the contact holes 120a, 120b and 120c, and on exposed portions of the first connection patterns 110 and the first routing wires 112. Accordingly, hollows or cavities 122a, 122b, and 122c are respectively formed by the portions of the plurality of first electrode patterns 131 being partially filled in the contact holes 120a, 120b and 120c.

In embodiments of the invention, a cross section that is perpendicular to an axial direction of at least one of the first to fourth contact holes 120a, 120b, 120c, and 120d may be any shape. A rectangular shape is shown in FIG. 8A, but embodiments of the invention includes having circular, oval, polygonal, or irregular shapes. Additionally, at least one of the hollows or cavities 122a, 122b, and 122c may be formed to extend in an axial direction of at least one of the first to fourth contact holes 120a, 120b, 120c, and 120d (see FIG. 8A). Additionally, a depth of at least one of the hollows or cavities 122a, 122b, and 122c may be about 2,000 Å to about 9,000 Å in the axial direction depending on a thickness of the insulation layer 120 and at thickness of the pluralities of first and second electrode patterns.

Here, each of the first and second electrode patterns 131 and 136 is formed in a triangle, a quadrangle, a diamond, a polygon shape and so on, but a shape of the first and second electrode patterns 131 and 136 is not limited thereto and may include other random shapes. Further, in the example embodiment of this invention, the first electrode patterns 131 formed on the insulation layer 120 are separated, and the second electrode patterns 136 are integrally formed with the second connection pattern 137, but the first electrode patterns 131 may be integrally formed with a connection pattern on the insulation layer 120, and the second electrode patterns 136 may be separated. In this later instance, the second electrode patterns 136 are electrically connected by another connection pattern formed between the insulation layer 120 and the substrate 100.

Next, a pad part C including a plurality of first pads 116 and a plurality of second pads 118 is formed. The plurality of first pads 116 are connected to the plurality of first electrode serials 130 through the plurality of first routing wires 112, respectively, and the plurality of second pads 118 are connected to the plurality of second electrode serials 135 through the plurality of second routing wires 114, respectively.

According to the example embodiment of this invention, because the first connection patterns 110 and the first and second routing wires 112 and 114 are formed through the same process, at least one mask process may be omitted. Therefore, a cost can be reduced and a tact time can be reduced according to reduction of the number of masks.

Further, in the example embodiment, because silicon nitride (SiNx) is used as the insulation layer 120, a visibility problem occurring due to a color difference between the insulation layer 120 and a periphery can be solved or reduced. Because a thickness of the insulation layer 120 is set to a range of 5,000 Å to 7,000 Å, a transmittance becomes a maximum and a color transition phenomenon becomes a minimum and thus a destruction or damage phenomenon of the insulation layer 120 can be suppressed. Therefore, stability of the touch screen panel can be remarkably improved.

Figure 10:
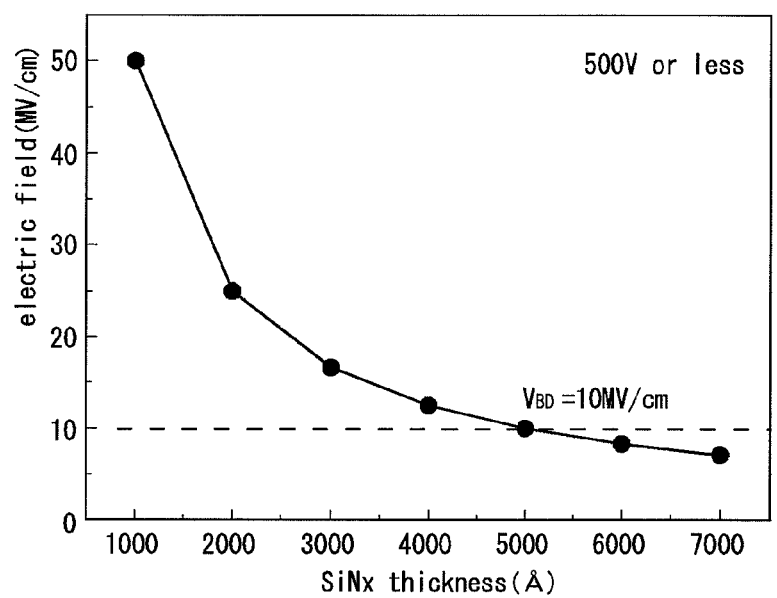
FIG. 10 is a graph illustrating an electric field value of a breakdown point in which an insulation layer is destroyed or damaged according to a thickness of silicon nitride used as an insulation layer when a thickness of ITO used as first and second electrode patterns is 1,400 Å.
Figure 11:
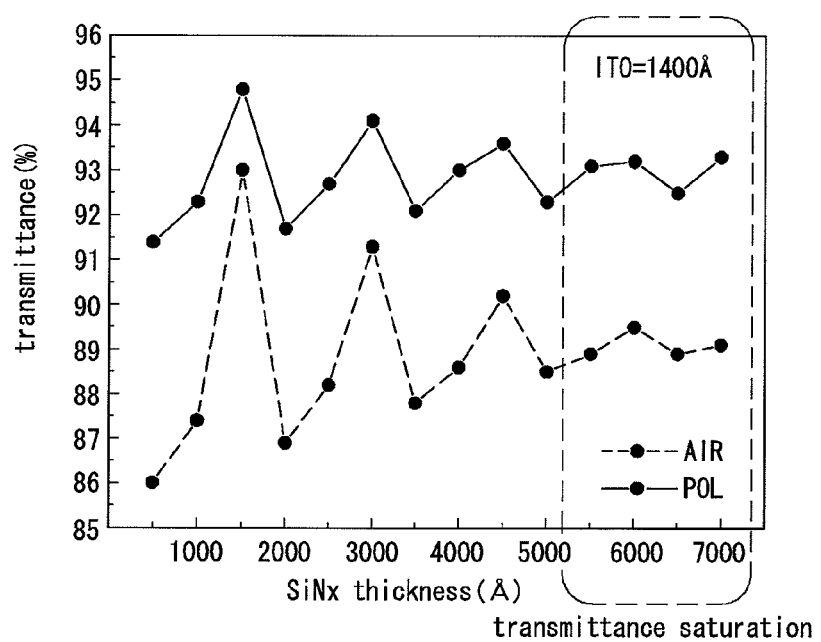
FIG. 11 is a graph illustrating a transmittance of a touch screen panel according to a thickness of silicon nitride used as an insulation layer when a thickness of ITO using as first and second electrode patterns is 1,400 Å.
Figure 12:
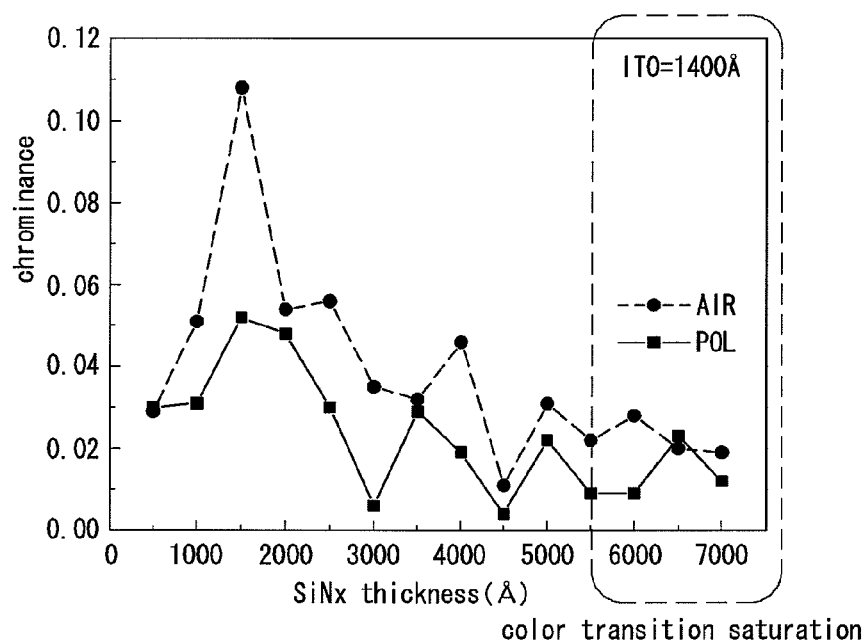
FIG. 12 is a graph illustrating a color transition characteristic of a touch screen panel according to a thickness of silicon nitride used as an insulation layer when that a thickness of ITO used as first and second electrode patterns is 1,400 Å.

FIGS. 10 to 12 are simulation graphs illustrating a breakdown voltage, a transmittance, and a color transition characteristic according to a thickness of silicon nitride in the touch screen panel formed by using ITO as the first and second electrode patterns 131 and 136 and using silicon nitride as the insulation layer 120.

FIG. 10 is a graph illustrating an electric field value of a breakdown point in which an insulation layer is destroyed or damaged according to a thickness of silicon nitride used as an insulation layer when a thickness of ITO used as first and second electrode patterns is about 1,400 Å. In FIG. 10, a horizontal axis represents a thickness (Å) of silicon nitride and a vertical axis represents intensity (MV/cm) of an electric field. As shown in FIG. 10, it is very important to appropriately adjust a thickness of silicon nitride because silicon nitride is destroyed or damaged when an electric field of 10 megavolt/cm or more is applied. In a condition in which a voltage (this value is a reliability condition of a touch screen panel manufacturer) of 500 volts or less is applied between the first and second electrode patterns 131 and 136 of the touch screen panel, when a thickness of silicon nitride is about 5,000 Å or less, insulation of silicon nitride was destroyed or damaged. Therefore, silicon nitride as the insulation layer 120 should be formed in a thickness of 5,000 Å or more.

FIG. 11 is a graph illustrating a transmittance of a touch screen panel according to a thickness of silicon nitride used as the insulation layer 120 when a thickness of ITO using as the first and second electrode patterns 131 and 136 is about 1,400 Å. In FIG. 11, a horizontal axis represents a thickness (Å) of silicon nitride and a vertical axis represents a transmittance (%), "AIR" represents a transmittance of an instance in which a polarization sheet is not attached to the touch screen panel, and "POL" represents a transmittance of instance in which a polarization sheet is attached to the touch screen panel. As can be seen from FIG. 11, in a thickness of 5,000 Å or more in which the insulation layer 120 is not destroyed or damaged, a transmittance gradually increases in a thickness of about 5,000 Å, arrives at a peak value in a thickness of about 6,000 Å, falls again to a thickness of about 6,500 Å, and increases again to a thickness of about 7,000 Å. That is, in an insulation layer thickness of 6,000 Å or more, because a transmittance is saturated, even if a thickness deviation occurs, there is no or little change of transmittance. FIG. 11 shows that a single touch screen panel has a transmittance of about 89%, and when a polarization sheet is attached to the touch screen panel, a transmittance of about 93% was obtained.

FIG. 12 is a graph illustrating a color transition characteristic of the touch screen panel according to a thickness of silicon nitride used as an insulation layer when a thickness of ITO used as first and second electrode patterns is 1,400 Å. In FIG. 12, a horizontal axis represents a thickness (Å) of silicon nitride and a vertical axis represents a chrominance, "AIR" represents a chrominance of an instance in which a polarization sheet is not attached to the touch screen panel, and "POL" represents a chrominance of an instance in which a polarization sheet is attached to the touch screen panel. As can be seen from FIG. 12, similarly to an instance of a transmittance, in a thickness of 5,000 Å or more in which the insulation layer 120 is not destroyed or damaged, a color transition characteristic is similar to a transmittance characteristic.

Figure 13:
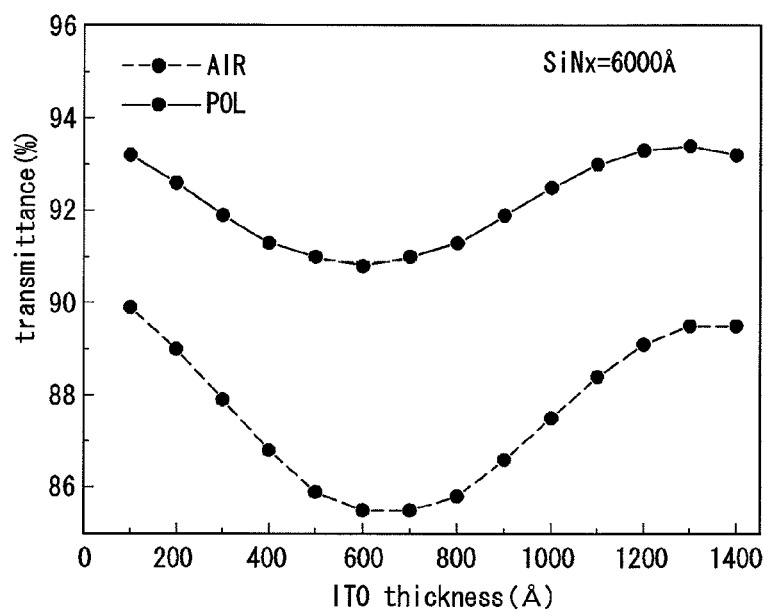
FIG. 13 is a graph illustrating a characteristic of a transmittance according to a thickness of ITO used as first and second electrode patterns when a thickness of silicon nitride formed as an insulation layer is 6,000 Å.
Figure 14:
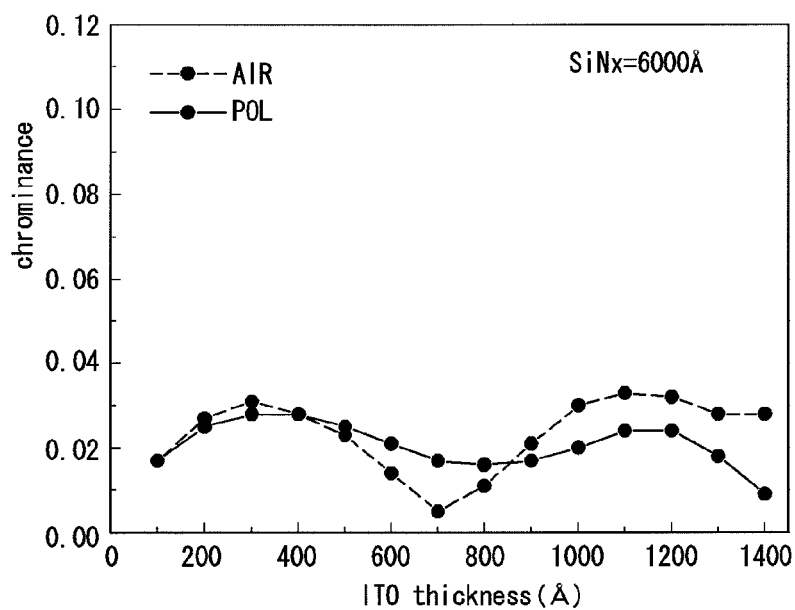
FIG. 14 is a graph illustrating a color transition characteristic according to a thickness of ITO used as first and second electrode patterns when a thickness of silicon nitride formed as an insulation layer is 6,000 Å.

FIGS. 13 and 14 are simulation graphs of a transmittance characteristic and a color transition characteristic according to a thickness of an ITO layer in the touch screen panel formed by using ITO as the first and second electrode patterns 131 and 136 and using silicon nitride as an insulation layer 120.

FIG. 13 is a graph illustrating a characteristic of transmittance according to a thickness of ITO used as the first and second electrode patterns 131 and 136 when a thickness of silicon nitride formed as an insulation layer 120 is 6,000 Å. In FIG. 13, a horizontal axis represents a thickness (Å) of an ITO layer, a vertical axis represents a transmittance (%), "AIR" represents a transmittance of an instance in which a polarization sheet is not attached to the touch screen panel, and "POL" represents a transmittance of an instance in which a polarization sheet is attached to the touch screen panel. As can be seen from FIG. 13, a thickness of silicon nitride is fixed to 6,000 Å and a light transmittance according to an ITO thickness has a minimum value in 700 Å and has a maximum value in 1400 Å.

FIG. 14 is a graph illustrating a color transition characteristic according to a thickness of ITO used as first and second electrode patterns when a thickness of silicon nitride formed as an insulation layer is 6,000 Å. In FIG. 14, a horizontal axis represents a thickness (Å) of an ITO layer and a vertical axis represents a chrominance, "AIR" represents a color transition degree of an example in which a polarization sheet is not attached to the touch screen panel, and "POL" represents a color transition degree of an instance in which a polarization sheet is formed in the touch screen panel. As can be seen from FIG. 14, when a thickness of silicon nitride is fixed to 6,000 Å and a color transition degree according to an ITO thickness is measured, the color transition degree has a minimum value in about 700 Å, and thus an optimum ITO thickness is obtained in about 100 Å or about 1400 Å. However, in a display of a notebook computer size or more, due to a resistance problem, an optimum ITO thickness is obtained in about 1400 Å. In a consideration of a thickness range of silicon nitride used in the example embodiment, when a thickness of ITO is about 1,200 Å to about 1,600 Å, a maximum transmittance is obtained.

Further, in the example embodiment, because the first and second electrode serials 130 and 135 and the second connection patterns 137 are formed on a top layer of the touch screen panel, a scratch does not occur in a subsequent process.

Figure 15:
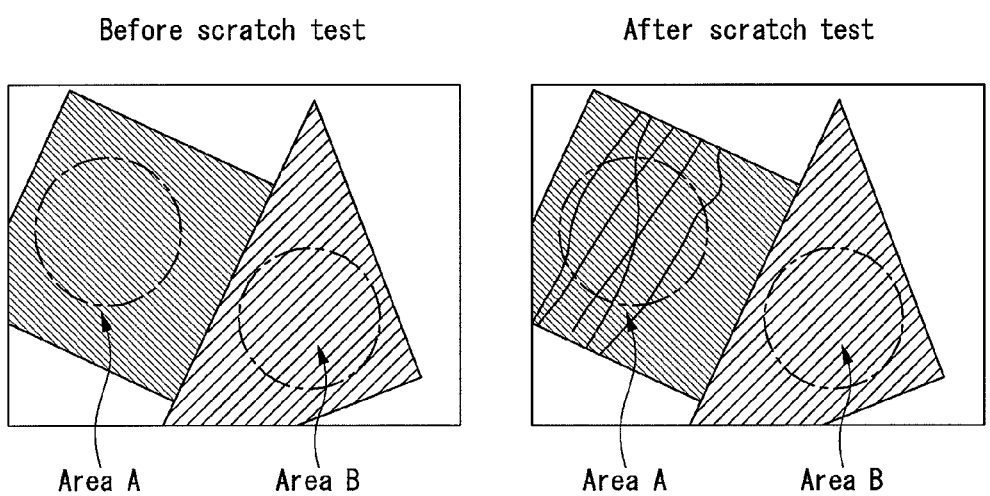
FIG. 15 is a drawing illustrating a result before and after performing a scratch test of an area A in which the top of a touch screen panel is an insulation layer and an area B in which the top of a touch screen panel is ITO.

FIG. 15 is a drawing illustrating a result before and after performing a scratch test of an area A in which the top of a touch screen panel is an insulation layer and an area B in which the top of a touch screen panel is ITO. In the result after performing a scratch test, a scratch occurs in the area A of the insulation layer, but a scratch does not occur in the area B of ITO.

Further, as a thickness of the first connection pattern formed between the insulation layer and the substrate to connect the first electrode patterns is formed in about 2,000 Å to about 3,000 Å, good proccessability and an appropriate resistance value can be obtained, and as a width is set to a range of about 3 μm to about 10 μm, a pattern is not visible.

Figure 16:
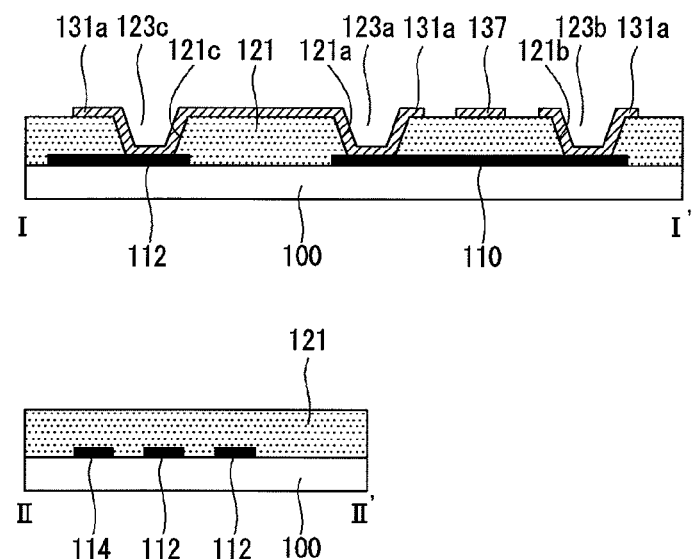
FIG. 16 is a cross-sectional view illustrating a touch screen panel according to another embodiment of the invention.

FIG. 16 is a cross-sectional view illustrating a touch screen panel according to another embodiment of the invention. Similar to the touch screen panel shown in FIG. 6, the touch screen panel of FIG. 16 includes a substrate 100, first connection patterns 110 and first routing wires 112 formed on a substrate 100, an insulation layer 121 formed over the substrate 100, first and second contact holes 121a and 121b for exposing portions of the first connection patterns 110 and a third contact hole 121c for exposing one portion of the first routing wires 112 and a fourth contact hole (not shown but similar to 120d of FIG. 8A) for exposing one portion of second routing wires 114. In the embodiment of FIG. 16, at least one of the first to fourth contact holes are formed in the insulating layer 121 at an angle so that the contact hole narrows in a depth-wise (or axial) direction. In other embodiments, the contact hole may widen in the depth-wise (or axial)

direction. The angle between the a side of at least one of the contact holes, and a surface of the substrate 110, for example, may be acute or obtuse. In an embodiment of the invention, the angle may be between about 30° to about 90°.

Further, a plurality of first electrode serials 130 and a plurality of second electrode serials 135 are formed on the insulation layer 121 in which the first to fourth contact holes are formed. Each of the plurality of first electrode serials 130 includes a plurality of first electrode patterns 131a and is optionally arranged in a first direction (for example, an x-axis direction). Each of the plurality of second electrode serials 135 includes a plurality of second electrode patterns (not shown) and is optionally arranged in a second direction (for example, a y-axis direction) intersecting the first direction. Because the first electrode patterns 131a forming the first electrode serial 130 are separated from each other, the first electrode patterns 131a are connected to the portions of the first connection pattern 110 exposed through the first and second contact holes 121a and 121b formed in the insulation layer 121, and the first electrode patterns 131a positioned at the outermost side are connected to the first routing wires 112 exposed through the third contact hole 121c.

As shown in FIG. 16, portions of the plurality of first electrode patterns 131a are formed in the contact holes 121a, 121b and 121c so that the portions of the plurality of first electrode patterns 131 are partially filled in the contact holes 121a, 121b and 121c. For example, portions of the plurality of first electrode patterns 131a are formed on side walls of the contact holes 121a, 121b and 121c, and on exposed portions of the first connection patterns 110 and the first routing wires 112. Accordingly, at least one of hollows or cavities 123a, 123b, and 123c are respectively formed by the portions of the plurality of first electrode patterns 131a being partially filled in the contact holes 121a, 121b and 121c. Additionally, a surface of the first electrode patterns 131a exposed to the at least one of the hollows or cavities 123a, 123b, and 123c, may have an angle with respect to the substrate 110 that may be acute or obtuse. In an embodiment of the invention, at least one of the angles may be between about 30° to about 90.

In an embodiment of the invention, the hollows or cavities need not be opened at one end. That is, an opening of at least one of the hollows or cavities may be plugged by a portion of at least one of first electrode patterns.

The touch screen panels according to the example embodiments of this invention may be applied to display devices such as a liquid crystal display, a field emission display, a plasma display panel, an electroluminescence device, an electrophoresis display and a flexible display. In these cases, the substrates of the touch screen panels may be also used as substrates of the display devices.

Although example embodiments have been described with reference to a number of illustrative examples, it should be understood that numerous other modifications and changes can be devised by those skilled in the art that will fall within the scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A touch screen panel, comprising:
   a substrate;
   an electrode forming part comprising a plurality of first electrode serials and a plurality of second electrode serials formed on the substrate, the plurality of first electrode serials being arranged in parallel in a first direction, and the plurality of second electrode serials being arranged to intersect the first electrode serials;
   a routing wire forming part formed on the substrate at positions outside the electrode forming part and comprising a plurality of first routing wires connected to the plurality of first electrode serials, respectively, and a plurality of second routing wires connected to the plurality of second electrode serials, respectively;
   a plurality of first connection patterns formed on the same layer with the pluralities of first and second routing wires;
   a single insulation layer formed between the pluralities of first and second electrode serials and the substrate, and having a plurality of contact holes to expose portions of the plurality of first connection patterns; and
   a plurality of second connection patterns formed above the plurality of first connection patterns, respectively, and on the insulation layer,
   wherein each of the plurality of first electrode serials comprises a plurality of first electrode patterns and each of the plurality of second electrode serials comprises a plurality of second electrode patterns,
   the plurality of first electrode patterns is formed as separated plurality of patterns, and the separated plurality of patterns are connected to each other through the plurality of contact holes and by the plurality of first connection patterns,
   the insulation layer has a thickness of 5000 Å to 7000 Å,
   lower portions of the plurality of first electrode patterns are formed in the plurality of contact holes, respectively, and on the plurality of first connection patterns, and
   upper portions of the plurality of first electrode patterns are formed on the insulation layer, the same layer on which the plurality of second connection patterns is formed.

2. The touch screen panel of claim 1, wherein the plurality of first connection patterns and the pluralities of first and second routing wires are formed of the same material.

3. The touch screen panel of claim 1, wherein the plurality of first connection patterns and the pluralities of first and second routing wires are formed of different materials.

4. The touch screen panel of claim 1, wherein the plurality of first connection patterns and the pluralities of first and second routing wires are formed of one of Al, AlNd, Cu, Ag, Mo, MoTi and Cr.

5. The touch screen panel of claim 1, wherein at least one of the plurality of first electrode patterns and the plurality of second electrode patterns include shapes of one of a triangle, a quadrangle, a diamond and a polygon.

6. The touch screen panel of claim 1, wherein the insulation layer includes silicon nitride, and the plurality of first electrode serials and the plurality of second electrode serials include a transparent conductive material.

7. The touch screen panel of claim 1, wherein the plurality of first connection patterns has a thickness of about 2000 Å to about 3000 Å, and has a width of about 3 μm to about 10 μm.

8. The touch screen panel of claim 1, wherein the pluralities of first and second electrode patterns have thicknesses of about 1200 Å to about 1600 Å.

9. The touch screen panel of claim 1, wherein a hollow is formed by a portion of the plurality of first electrode patterns being partially filled in the plurality of contact holes.

10. A method of manufacturing a touch screen panel, the method comprising:

a first process of forming a plurality of first connection patterns, a plurality of first routing wires, and a plurality of second routing wires simultaneously on a substrate;

a second process of forming a single insulation layer on an entire surface of the substrate and a plurality of contact holes in the insulating layer for exposing portions of at least one of the plurality of first connection patterns;

a third process of forming a plurality of second connection patterns above the plurality of first connection patterns, respectively, and on the insulation layer; and a fourth process of forming a plurality of first electrode serials and a plurality of second electrode serials on the insulation layer in which the plurality of contact holes are formed, the plurality of first electrode serials being arranged in parallel in a first direction, and the plurality of second electrode serials being arranged in parallel in a second direction intersecting the first direction, wherein the insulation layer has a thickness of 5000 Å to 7000 Å, lower portions of the plurality of first electrode patterns are formed in the plurality of contact holes, respectively, and on the plurality of first connection patterns, and upper portions of the plurality of first electrode patterns are formed on the insulation layer, the same layer on which the plurality of second connection patterns is formed.

11. The method of claim 10, wherein the first process includes depositing a first conductive layer on the substrate by a deposition process and forming the plurality of first connection patterns, the plurality of first routing wires, and the plurality of second routing wires by patterning the first conductive layer with a photolithography process and an etching process using a first mask;

the second process includes forming the insulation layer through a deposition process and forming the plurality of contact holes for exposing the portions of the at least one of the plurality of first connection patterns, a portion of at least one of the plurality of first routing wires, and a portion of at least one of the plurality of second routing wires with a photolithography process and an etching process using a second mask; and the fourth process includes depositing a second conductive layer through a deposition process on the insulation layer in which the plurality of contact holes are formed and forming the plurality of first electrode serials and the plurality of second electrode serials by patterning the second conductive layer with a photolithography process and an etching process using a third mask.

12. The method of claim 10, wherein the plurality of first connection patterns and the pluralities of first and second routing wires are formed of one of Al, AlNd, Cu, Ag, Mo, MoTi and Cr.

13. The method of claim 10, wherein at least one of the plurality of first electrode patterns and the plurality of second electrode patterns include shapes of one of a triangle, a quadrangle, a diamond and a polygon.

14. The method of claim 10, wherein the insulation layer includes silicon nitride, and the plurality of first electrode serials and the plurality of second electrode serials include a transparent conductive material.

15. The method of claim 10, wherein the plurality of first connection patterns has a thickness of about 2000 Å to about 3000 Å, and has a width of about 3 μm to about 10 μm.

16. The method of claim 10, wherein the pluralities of first and second electrode patterns have thicknesses of about 1200 Å to about 1600 Å.

17. A touch screen panel, comprising:

a substrate;

a plurality of first connection patterns formed on the substrate;

a single insulation layer formed on the substrate to cover the plurality of first connection patterns, and having a plurality of contact holes that exposes portions of the plurality of first connection patterns;

a plurality of second connection patterns formed above the plurality of first connection patterns, respectively, and on the insulation layer; and a plurality of first electrodes and a plurality of second electrodes formed on the insulating layer, the plurality of first electrodes being arranged in parallel in a first direction, and the plurality of second electrodes being arranged in a second direction that intersects the first direction, wherein at least one of the plurality of first connection patterns connects at least one adjacent pair of the plurality of first electrodes through at least two of the plurality of contact holes that expose respective portions of the at least one of the plurality of first connection patterns, and at least one hollow is formed by portions of the at least one adjacent pair of the plurality of first electrodes being formed in the at least two of the plurality of contact holes, the insulation layer has a thickness of 5000 Å to 7000 Å, lower portions of the plurality of first electrode patterns are formed in the plurality of contact holes, respectively, and on the plurality of first connection patterns, and upper portions of the plurality of first electrode patterns are formed on the insulation layer, the same layer on which each of the plurality of second connection patterns is formed.

* * * * *